United States Patent

Calhoun

[15] 3,670,956

[45] June 20, 1972

[54] DIGITAL BINARY MULTIPLIER EMPLOYING SUM OF CROSS PRODUCTS TECHNIQUE

[72] Inventor: Donald F. Calhoun, Inglewood, Calif.

[73] Assignee: Hughes Aircraft Company, Culver City, Calif.

[22] Filed: April 23, 1971

[21] Appl. No.: 136,808

Related U.S. Application Data

[63] Continuation of Ser. No. 762,852, Sept. 26, 1968, abandoned.

[52] U.S. Cl. ....................235/164
[51] Int. Cl. ....................G06f 7/52
[58] Field of Search ....................235/164, 156

[56] References Cited

UNITED STATES PATENTS 2,941,720 6/1960 Marshall, Jr. et al. ....................235/164
3,407,290 10/1968 Atrubin ....................235/164

OTHER PUBLICATIONS

R. K. Richards, Arithmetic Operations in Digital Computers 1955 pp. 138–140

*Primary Examiner*—Malcolm A. Morrison
*Assistant Examiner*—David H. Malzahn
*Attorney*—W. H. MacAllister, Jr. and Bernard P. Drachlis

[57] ABSTRACT

A high-speed digital multiplier which includes a plurality of functionally and structurally similar multiplier modules which are independent and operate in parallel. The multiplicand and multiplier bits are ANDed and selectively applied to the multiplier modules in accordance with a geometrically similar partitioning of the multiplication matrix. The multiplier modules provide partial products which are then added together to form the final product. The disclosed multiplier may be expanded for longer word lengths by using additional multiplier modules. The multiplier may be fabricated from a plurality of single type gated full adder circuits which is advantageous for large scale integration techniques.

6 Claims, 11 Drawing Figures

INVENTOR
DONALD F. CALHOUN,
BY
Bernard P. Drachlis
ATTORNEY

DIGITAL BINARY MULTIPLIER EMPLOYING SUM OF CROSS PRODUCTS TECHNIQUE

This application is a continuation of Ser. No. 762,852 filed Sept. 26, 1968, now abandoned.

BACKGROUND OF THE INVENTION

This invention relates generally to data processing circuits and relates more particularly to digital multiplier circuits.

Conventional multi-bit multiplier circuits of one common type have selectively fed a multiplicand to an accumulator in response to a multiplier. For example, the multiplier was utilized by a control circuit, one bit at a time, such as starting with the least significant bit, to feed the multiplicand into the accumulator each time a multiplier bit is at a ONE level to form a partial product in the accumulator. The partial product was then shifted to the right by one digit for the digit in the multiplier. Thereafter, the next significant digit of the multiplier determines whether the multiplicand should be fed to the accumulator and added to the partial product, and the partial product was shifted to the right and so forth, until all digits of the multiplier have been so processed.

Multiplier circuits of this type required many functionally different circuits such as storage circuits, shift registers, and control circuits, each of which required structurally different circuit components such as flip flops, gates, and full adders. Furthermore, shift and control logic was necessary in order to sequentially use the same circuit more than once. In addition, there was a relatively long delay in operation of this device, since the carries had to be propagated through all of the circuit stages. In addition, other speed-up techniques on the one-bit-at-a-time technique are available which required further specialized control logic.

SUMMARY OF THE INVENTION

An object of this invention is to provide an improved high-speed digital circuit.

Another object of this invention is to provide an improved modular, high-speed digital multiplier circuit.

Other objectives of this invention can be attained with a multiplier circuit featured by a plurality of functionally and structurally similar multiplier modules which are independent and operate in parallel with one another. The multiplicand and the multiplier are ANDed and selectively fed to the multiplication modules in accordance with a geometrically similar partitioning of the multiplication matrix. Each multiplication module includes a plurality of full adders or logic gates, which are interconnected to produce a partial product output signal with the carries being advanced toward the partial product output.

The partial products are fed in parallel from the plurality of multiplier modules to a high-speed, carry-advance adder which also includes a plurality of the full adder circuits or logic gates interconnected for a carry-advance operation in producing a final product output signal. The final product output signal can then be clocked into a register also having individual stages which are constructed from the full adder circuits or logic gates and arranged to store the individual bits of the final product.

Some advantages of this multiplier circuit are that it operates at high speed, it can be expanded or built up modularly to handle longer word lengths, it can utilize a single circuit type which lends itself to large scale integration, thereby allowing more circuits per package, it eliminates control, shift, or store logic, it can be implemented with a high gate-to-pin ratio, it can be readily tested and fault isolated whereupon the faulty module can be corrected for, and it can be expanded to add an operand to the final product, along with being applicable to many uses such as radar, data processing and video processing, to name a few.

BRIEF DESCRIPTION OF THE DRAWINGS

Other objects, features and advantages of this invention will become apparent upon reading the following detailed description of several embodiments and referring to the accompanying drawings, wherein:

Referring now to the drawings in more detail, FIG. 1 is a diagram illustrating a multiplication matrix which defines binary multiplication. More specifically, the diagram illustrates the multiplication of a multiplier having eight bits identified as M1 through M8 and a multiplicand having eight bits identified as N1 through N8. Each row of the multiplication matrix is formed by ANDing one bit of the multiplier with each successive bit of the multiplicand. For example, the first row of the matrix is formed by ANDing the first multiplier bit M1 with each of the multiplicand bits N1 through N8. Each successive row is formed in a similar manner using the successive multiplier bits. Each successive row is displaced one bit position to the left so that the columns are lined up according to significant bit positions. The columns in the matrix are summed to produce a final 16-bit product identified as P1 through P16.

It has been determined that if the multiplication matrix is partitioned or divided into geometrically similar blocks, MB1, MB2, MB3 and MB4 within the matrix as shown by the dashed lines, partial products can be independently formed for each grouping of four bits of the multiplier and four bits of the multiplicand in a modular manner. Since the multiplication operation which occurs within each one of the matrix modules is functionally identical except that the input signals associated with them differ, it is possible to implement a multiplication circuit with identical modular units, MB1, MB2, MB3 and MB4, as illustrated in FIG. 2.

Figure 1:
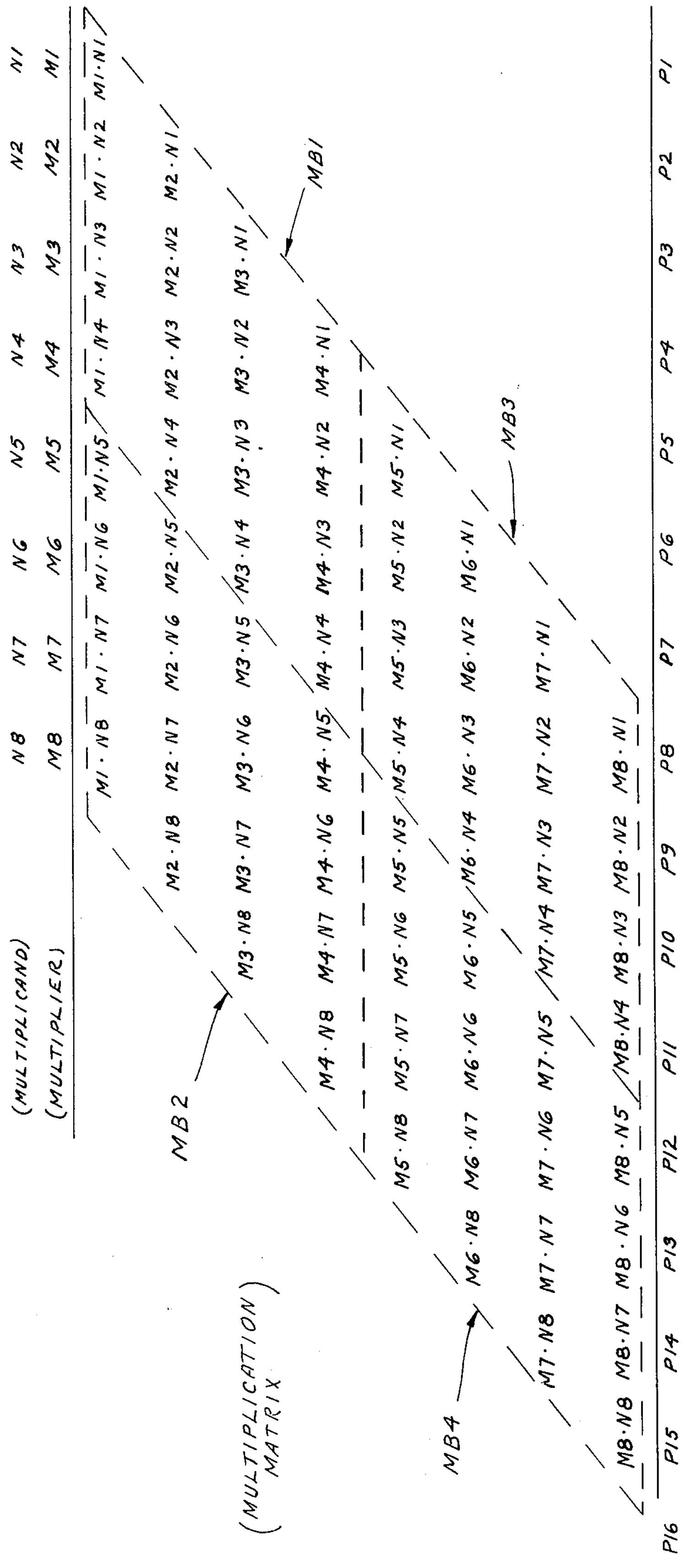
FIG. 1 is a diagram illustrating an eight-bit multiplicand, an eight-bit multiplier, a multiplication matrix associated with the multiplier and the multiplicand, and a final product.
Figure 2:
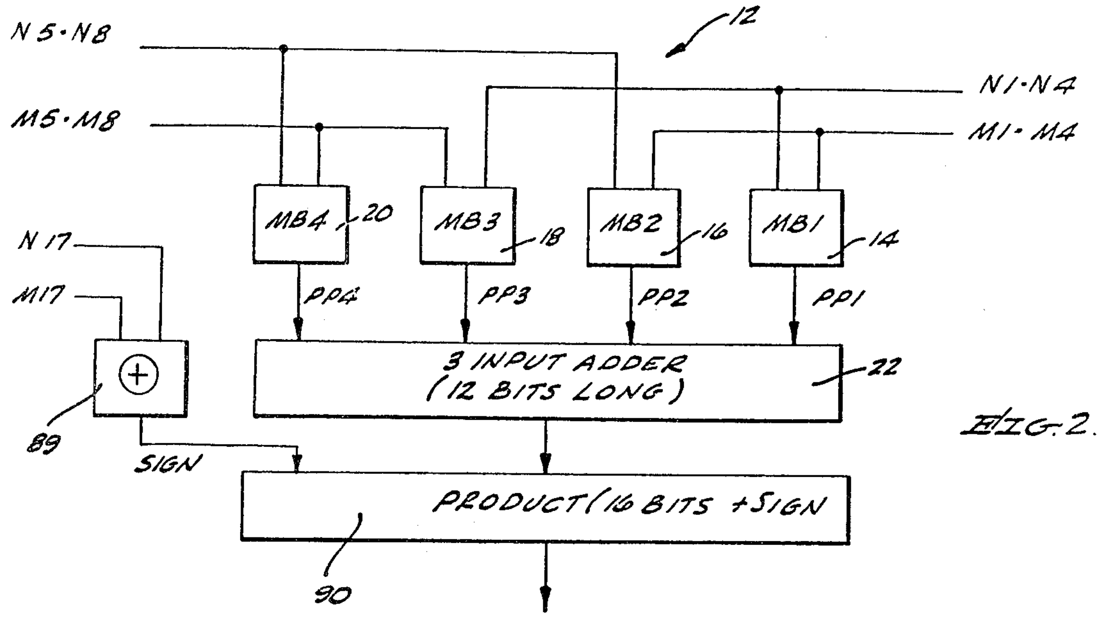
FIG. 2 is a block diagram of the modular high-speed multiplier wherein each multiplication module produces the partial product for four bits of the multiplier and four bits of the multiplicand in parallel and feeds the partial products to a high-speed carry-advance adder.

The multiplier circuit 12 illustrated in FIG. 2 includes four multiplier modules, 14, 16, 18 and 20, which are each connected to receive a unique combination of four bits of the multiplier and four bits of the multiplicand to produce four partial products outputs, PP1, PP2, PP3 and PP4, respectively. For example, multiplier module 14 associated with the partitioned multiplication matrix MB1 receives the multiplicand bits N1 through N4, and the multiplier bits M1 through M4. The bits are ANDed and columnarly summed in accordance with the partitioned portion MB1 of the matrix of FIG. 1 to produce a partial product PP1, having eight bits, A1 through A8, as illustrated in FIG. 3*a*.

The multiplier module 16 associated with the partitioned multiplication matrix MB2 receives the four multiplier bits M1 through M4, along with four multiplicand bits, N5 through N8. The bits are ANDed and columnarly summed in accordance with the partitioned portion MB2 of the matrix of FIG. 1 to produce a partial product PP2, having eight bits, B5 through B12, as illustrated in FIG. 3*a*.

The multiplier module 18 associated with the partitioned multiplication matrix MB3 receives the multiplier bits M5 through M8 and the multiplicand bits N1 through N4. The bits are ANDed and columnarly summed in accordance with the partitioned portion MB3 of the matrix of FIG. 1 to produce a partial product PP3, having eight bits, C5 through C12, as illustrated in FIG. 3*a*.

The multiplier module 20 associated with the partitioned multiplication matrix MB4 receives the multiplier bits M5 through M8 and the multiplicand bits N5 through N8. The bits are ANDed and columnarly summed in accordance with the partitioned portion MB4 of the matrix of FIG. 1 to produce a partial product PP4, having eight bits, D9 through D16, as illustrated in FIG. 3*a*.

These four partial products, PP1, PP2, PP3 and PP4 are fed in parallel to an adder circuit 22 shown in FIG. 2 having a multi-operand carry-advance feature to produce the final product of 16 bits identified as the bits P1 through P16 in FIG. 3*a*.

As noted, FIG. 3*a* illustrates the partial products of each of the multiplier modules MB1, MB2, MB3 and MB4 and the final summation of these partial products to form the final product of 16 bits identified as P1 through P16.

Figure 4:
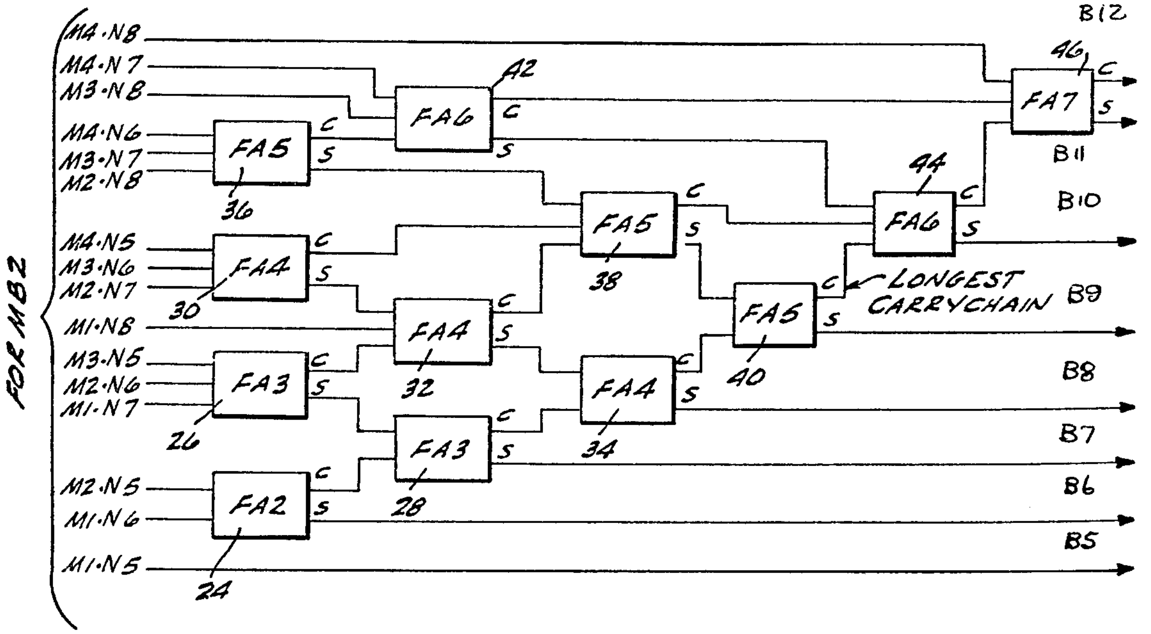
FIG. 4 is a block diagram illustrating a multiplier module of FIG. 2 having a plurality of full adders interconnected therein wherein the specific input signals and output signals are related to the multiplier module MB2.

The details of a multiplier module are shown in FIG. 4 wherein a plurality of full adders are interconnected together to produce a partial product. Although the circuit of FIG. 4 is representative of all of the multiplier modules, it has been arbitrarily designated to receive the input bits M1 through M4 and N5 through N8 and produce the partial product output bits B5 through B12 associated with the second multiplier module 16 and as a result is explained with reference to the partitioned multiplier matrix MB2 reproduced in FIG. 3*b*. It should be understood that the multiplier modules 14, 16, 18 and 20 may be fabricated in any convenient manner. However, it is usually advantageous to use as few different types of circuits as possible. Thus, the fabrication of the multiplier module 16 shown in FIG. 4 uses a plurality of full adder circuits 24 through 46. Each of the full adder circuits produces a sum signal S and a carry signal C in response to inputs X, Y, Z in accordance with the well known equations:

$$S = XYZ + XYZ + XYZ + XYZ$$

$$C = XYZ + XYZ + XYZ + XYZ$$

Some of the full adder circuits shown in FIG. 4 have only two inputs and thus functionally operate as half-adders. This results in some extra circuitry, but as noted above, it is generally advantageous to minimize the number of different circuit types.

Figure 3B:
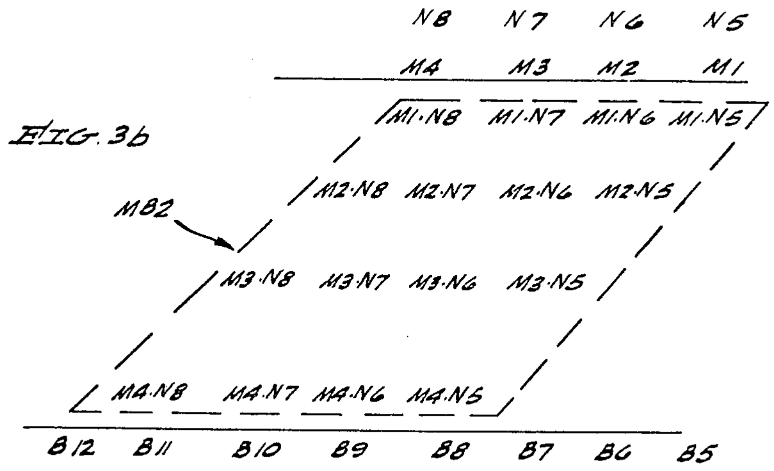
FIGS. 3*a* and 3*b* are respectively diagrams illustrating general partial products and final products for an eight-bit multiplicand and multiplier and the partial product matrix for a four-bit multiplier and multiplicand.
Figure 3A:
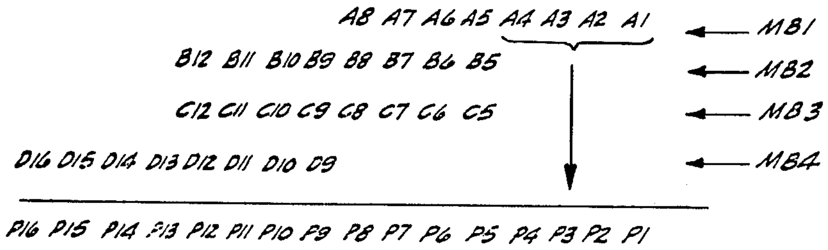

Considering that the inputs to the individual full adders represent any one of the ANDed multiplier and multiplication bits in the matrix, reference is now made to the operation of the multiplication module of FIG. 4 with reference to FIG. 3*b*. Since there is only one pair of ANDed bits M1·N5 in the rightmost column, the least significant bit B5 of the partial product PP2 is produced by feeding the input signal M1·N5 directly to an output terminal as the least significant partial product bit B5.

For the second least significant bit B6, the ANDed bits M1·N6 and M2·N5 in the next column are added together in full adder 24 to produce a sum output S, which is the bit B6 and a carry output C.

For the next significant bit B7, the ANDed bits M1·N7, M2·N6 and M3·N5 in the third column are added together in full adder 26 to produce a sum signal S and a carry signal C. This sum signal S from the full adder 26 and the carry signal C from the full adder 24 are fed to another full adder circuit 28 which, in turn, produces a sum signal S, which is the bit B7, and a carry signal C.

For the next significant bit B8 the ANDed multiplier and multiplicand bits M1·N8, M2·N7, M3·N6, and M4·N5 are added together as follows. The ANDed bits M2·N7, M3·N6, and M5·N5 are fed to full adder 30 to produce a sum signal S and a carry signal C. This sum signal S, the ANDed bits M1·N8, and the carry signal C from the full adder 26 are then fed to full adder 32 wherein they are added together to produce a sum signal S and a carry signal C. The sum signal S from the full adder 32 and the carry signal C from the full adder 28 are fed to the full adder 34 which adds them together to produce a sum signal S, which is the bit B8 of the partial product, and a carry output signal C.

To produce the next significant bit B9, the ANDed bits M2·N8, M3·N7 and M4·N6 are fed to full adder 36 to produce a sum output signal S and a carry signal C. This sum signal S from the full adder 36, the carry signal C from the full adder 30, and the carry signal C from the full adder 32 are fed to another full adder 38 to produce a sum signal S and a carry signal C. This sum signal S and the carry signal C from the full adder 34 are fed to still another full adder 40 to produce a sum output signal S which is the bit B9, and a carry output signal C.

To produce the next significant bit B10, the ANDed bits M3·N8 and M4·N7 are fed to full adder 42 along with the carry signal C from the full adder 36 to produce a sum output signal S and a carry output signal C. This sum output signal S, the carry output signal C of the full adder 38, and the carry output signal C of the full adder 40 are fed to full adder 44 to produce a sum output signal S, which is the bit B10 and a carry output signal C.

To produce the next two bits, B11 and B12 of the partial product PP2, the ANDed bits M4·N8, the carry signal C from the full adder 42, and the carry signal C from the full adder 44 are fed to full adder 46 which adds these signals together to produce a sum output signal S, which is the bit B11, and a carry signal C, which is the bit B12.

From this discussion, it can be seen that the longest possible carry chain in the multiplier module includes full adder 30, full adder 32, full adder 34, full adder 40, full adder 44 and full adder 46, wherein only the delays inherent in the full adders provide the delay as the carries are asynchronously advanced through the multiplier modules to the output.

As previously stated, the other multiplier modules operate in the same manner as described above with the sole difference being that the combinations of multiplier bits and multiplicand bits fed to them are unique to each multiplier module.

The four partial products, PP1, PP2, PP3 and PP4 which include the bits A1 through A8, B5 through B12, C5 through C12, and D9 through D16, respectively, are fed from the multiplier modules 14–20 to the carry advance adder 22.

Figure 5:
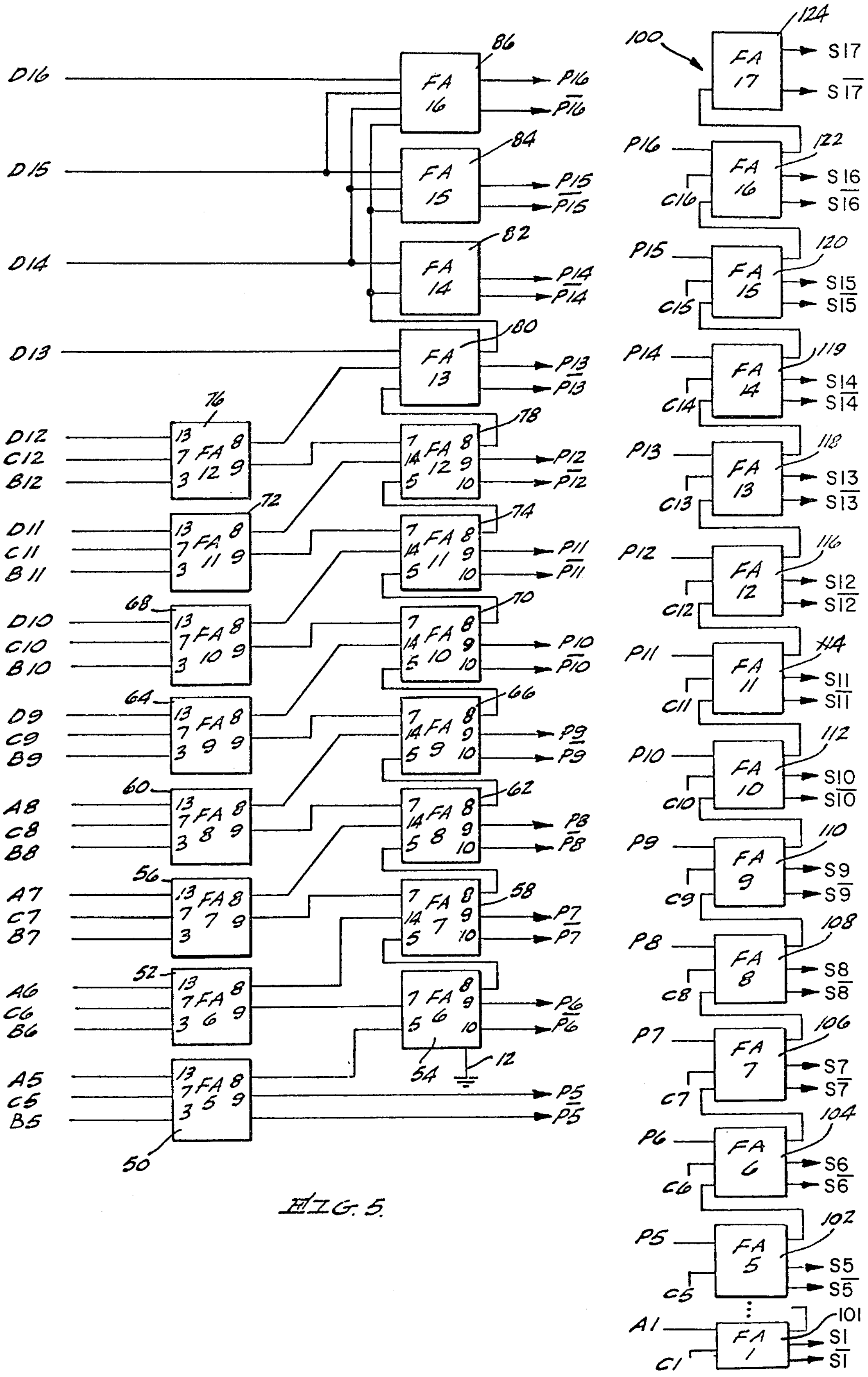
FIG. 5 is a block diagram of the 12-bit, carry advance adder of FIG. 2, using full adder circuits therein.

The carry-advance adder 22 as illustrated in FIG. 5 is a three-input adder having a plurality of full adder circuits 50 through 86 interconnected to add the partial products together and produce the final product bits P5 through P16. The adder 22 does not produce the least significant final product bits P1 through P4 since they are, as illustrated in FIG. 3*a*, equal to the partial product bits A1 through A4, respectively. Each of the full adders is responsive to the input signals to produce a sum output signal S and its complement, S, and a carry output signal in accordance with the previously described equations.

For example, to produce the fifth significant bit P5 of the final product, the partial product bits A5, B5, and C5 in the fifth column from the left of FIG. 3*a* are fed to full adder 50 of the adder in FIG. 5 to produce a sum signal S and its complement S, which are the fifth significant bit P5 and its complement P5, respectively, and a carry signal C.

To produce the sixth significant bit P6, the partial product bits A6, B6 and C6 are fed to a full adder 52 which produces a sum signal S and a carry signal C. This sum signal S along with the carry signal from the full adder 50 are fed to full adder 54 which produces a sum signal S and its complement, S which are the sixth significant bit, P6 and its complement P6, respectively, and produces a carry signal C.

To produce the seventh significant bit, P7, the partial product bits A7, B7 and C7 are fed to to full adder 56 to produce a sum signal S and a carry signal C. This sum signal S along with the carry signals C from full adder 52 and full adder 54 are fed to a full adder 58 which produces a sum signal S and its complement, S, which are the seventh significant bit, P7 and its complement, P7, respectively, and produces a carry signal C.

This process of summing three partial product bits from three of the four multiplier modules 14 through 20 in a first full adder to produce a sum and a carry signal and adding the sum signal with any carries produced for less significant bits is continued for the eighth significant bit, P8 through the 12th significant bit, P12.

For the four most significant bits P13 through P16, it can be seen with reference to FIG. 3*a* that these bits are equal to the partial product bits D13 through D16, respectively, plus any carries from the less significant bits.

Consequently, to produce the 13th significant bit, P13, the partial product bit D13 and the carries C from full adder 76 and full adder 78 are fed to a full adder 80 which produces a sum signal S and its complement S which are the 13th significant bit P13 and its complement P13 and produces a carry signal C which is fed to a next full adder 82.

Similarly, the 14th significant final product bit P14 is produced by feeding the partial product bit D14 and the carry C from full adder 80 to the full adder 82 to produce a sum signal S and its complement S which are the 14th significant product bit P14 and its complement P14 and to produce a carry signal C.

The last two full adders use carry look ahead logic to cut the total multiplication time by two carry delays by eliminating that portion of the module carry chain. For example, the 15th significant product bit P15 and its complement P15 are produced by feeding the partial product bits D14 and D15 and the carry C13 from full adder 80 to full adder 84 where they are added to produce a sum signal S and its complement S which are the product bit P15 and its complement P15, respectively, where $$P15 = D15(D14 \cdot C13) + D15(D14 \cdot C13)$$

The most significant product bit P16 is produced by feeding the partial product bits D14, D15 and D16 and the carry signal C13 from the full adder 80 to the full adder 86 to produce a sum signal S and its complement S which are equal to the most significant product bit P15 and its complement P16, where $$P16 = D16 + D15 \cdot D14 \cdot C13$$

Thus it can be seen that the delay which occurs in the multiplication occurs as a result of any carry path through the full adder plus any delay required in propagating the carry signal through the full adders 54, 58, 62, 66, 70, 74, 78, 80 and 82, 84 or 86.

In order to provide a sign bit, an EXCLUSIVE OR circuit 89 (FIG. 2) is coupled to receive the most significant multiplicand bit N17 and the most significant multiplier bit M17. Consequently, if the level of either one of the sign bits differs from the level of the other one, an output signal having a level indicative of a negative sign for the product is produced. If the level of both of the input signals N17 and M17 are the same, then an output signal indicative of a positive sign for the product is produced.

The 16-bit final product, P1 through P16, and its complement P1 through P16 are fed to a register 90 illustrated in FIG. 2 wherein they are stored. The register 90 can be a 17 stage clocked register which will store the 16 product magnitude bits plus a sign bit.

An operand K can be added to the product of the multiplier M and the multiplicand N in accordance with the equation $S = (M \times N) + K$, fulfilling the processing requirements of linear digital filtering. One way that this can be done is to add another stage of full adders in all of the final product digit paths to the adder 22 between the multiplier modules and the register 90 (FIG. 2). For example, referring to FIG. 5, the advance adder stage 100 includes a plurality of full adder circuits 101 through 124 connected to receive the final product bits P1 through P16, and the bits K1 through K16 of the operand to be added to the product, to produce the sum bits S1 through S17 and their complements S1 through S17, respectively. Each of the full adders 102 through 124 also produces a carry signal which is rippled from the least significant bit to the next most significant bit throughout the entire chain of adders 102 through 124. Of course, carry look ahead can also be used in the last stages. Since the ripple carries take place during the same time that the carry is occurring through the full adders 50 through 86, it does not introduce any significant additional delay to the multiplication operation. It should be understood that the full adders 102–124 could be coupled between the other full adders 50 through 86 and still operate.

Figure 6:
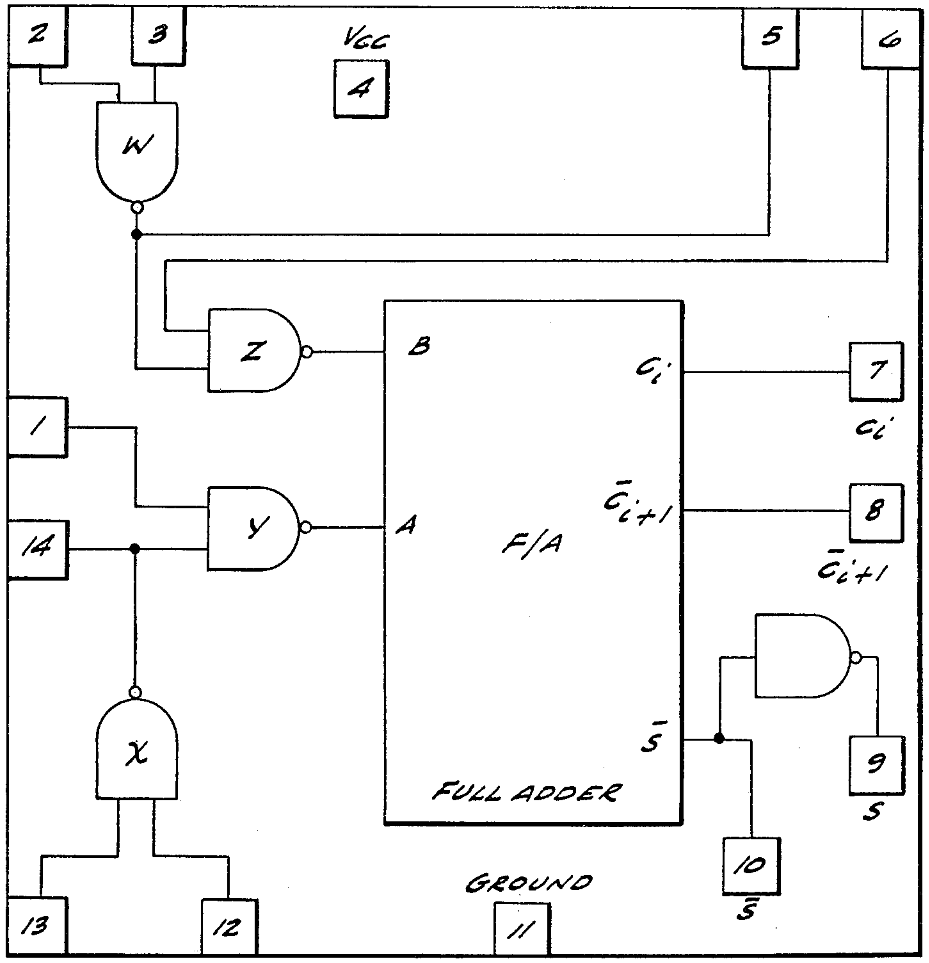
PRIOR ART FIG. 6.
FIG. 6 is a block diagram of one type of a commonly available gated full adder circuit which lends itself to application in this high-speed modular multiplier circuit.

Referring now to a specific example illustrating how this particular circuit can be implemented for application on a large scale integrated circuit basis, reference is made to a gated full adder building block circuit from which all of the previously described circuits can be fabricated. This specific gated full adder circuit illustrated in FIG. 6 provides the inverted sum S and inverted carry output $C_{i+1}$ for the input A, B and $C_i$ in accordance with the equations:

$$\text{Terminal 8 output} = \overline{A} \cdot \overline{B} \cdot \overline{C}_i + A \cdot \overline{B} \cdot \overline{C}_i + \overline{A} \cdot B \cdot \overline{C}_i + \overline{A} \cdot \overline{B} \cdot C_i = \overline{C}_{i-1} \quad (1)$$

$$\text{Terminal 10 output} = \overline{A} \cdot \overline{B} \cdot \overline{C}_i + A \cdot B \cdot \overline{C}_i + A \cdot \overline{B} \cdot C_i + \overline{A} \cdot B \cdot C_i = (S) \quad (2)$$

An advantage of this particular full adder circuit is that the pins 5 and 14 make the output of gates W and X available independently of other logic in the full adder. By grounding 1 and 6 to force the A and B inputs to be logical ONEs, pin 10 will then provide the inversion of the signal received on pin 7, since the equation (1) then reduces to $S = A \cdot B \cdot C_i = C_i$ Pin 9 could also be used to provide greater fanout for the signal on pin 7, since they are logically identical (i.e., $S = C_i$). Thus, two two-input NAND gates, a single input NAND gate, and a buffer can be realized simultaneously from the gated full adder of FIG. 6.

If an inverted half-adder function were required, an additional two-input NAND gate is available by bringing the inverted half-adder inputs into the full adder at terminal $C_i$ and A. When the adder is used in an inverted mode, inputs A, B, and $C_i$ are used as inputs to generate the true functions S and $C_{i+1}$ on pins 10 and 8, respectively. Then gate W is an independent gate if pin 6 is grounded to cause the B input to remain a logical ONE, which is a logical ZERO to the half adder in its inverted mode. That is, with pin 6 grounded, NAND gate Z is high, making the input B = 1 and reducing equations (1) and (2) to:

$$\text{Terminal 8 output} = A \cdot C_i$$

$$\text{Terminal 10 output} = A \cdot C_i + A \cdot C_i \quad (4)$$

But in an inverted mode, all input signals are complements of A, B AND $C_i$ and the outputs become the noncomplemented signals $C_{i+1}$ and S. With each signal in equations (3) and (4) thus complemented:

$$\text{Terminal 8 output} = A \cdot C_i = C_{i+1} \quad (5)$$

$$\text{Terminal 10 output} = A \cdot C_i + A \cdot C_i = S \quad (6)$$

which are the logic signals required of a half-adder circuit.

By grounding pin 6 but not using the complement mode, equations (3) and (4) then show that the NOR operation and the EXCLUSIVE OR operation of the input signal A and C are available on pins 8 and 10, respectively, while gate W can still be used independently as a two-input NAND gate. In addition to the above logic functions, the four gates, W, X, Y and Z allow efficiency in alternating true and complement mode full adders which saves external gating and increases speed by requiring only one gate delay between $C_i$ and $C_{i+1}$. For example, if the adder is being used in an inverted mode, the signals received at A, B and $C_i$ must be complement signals. The complement of the incoming carry can be brought to pin 7 directly from the preceding full adder. The A and B inputs can then be formed logically from up to four other logic signals by using the input gating. A common usage in the multiplier building blocks is to obtain the NAND function of corresponding multiplier and multiplicand bits by bringing signals into the A input through gate Y on pins 1 and 14, and bringing the B input through gate Z on pins 5 and 6, with the full adder then used in an inverted mode.

One prior art commonly available circuit which is so fabricated is the type SN5480 or SN7480 Gated Full Adder, manufactured by Texas Instruments Corporation and described and illustrated in the Texas Instruments Corporation 1967–1968 Integrated Circuits Catalog, on pages 1,027 through 1,031. Since this gated full adder circuit is manufactured on a wafer which includes a matrix of many identical circuits, this particular circuit would lend itself readily to large scale integration implementation.

Figure 7:
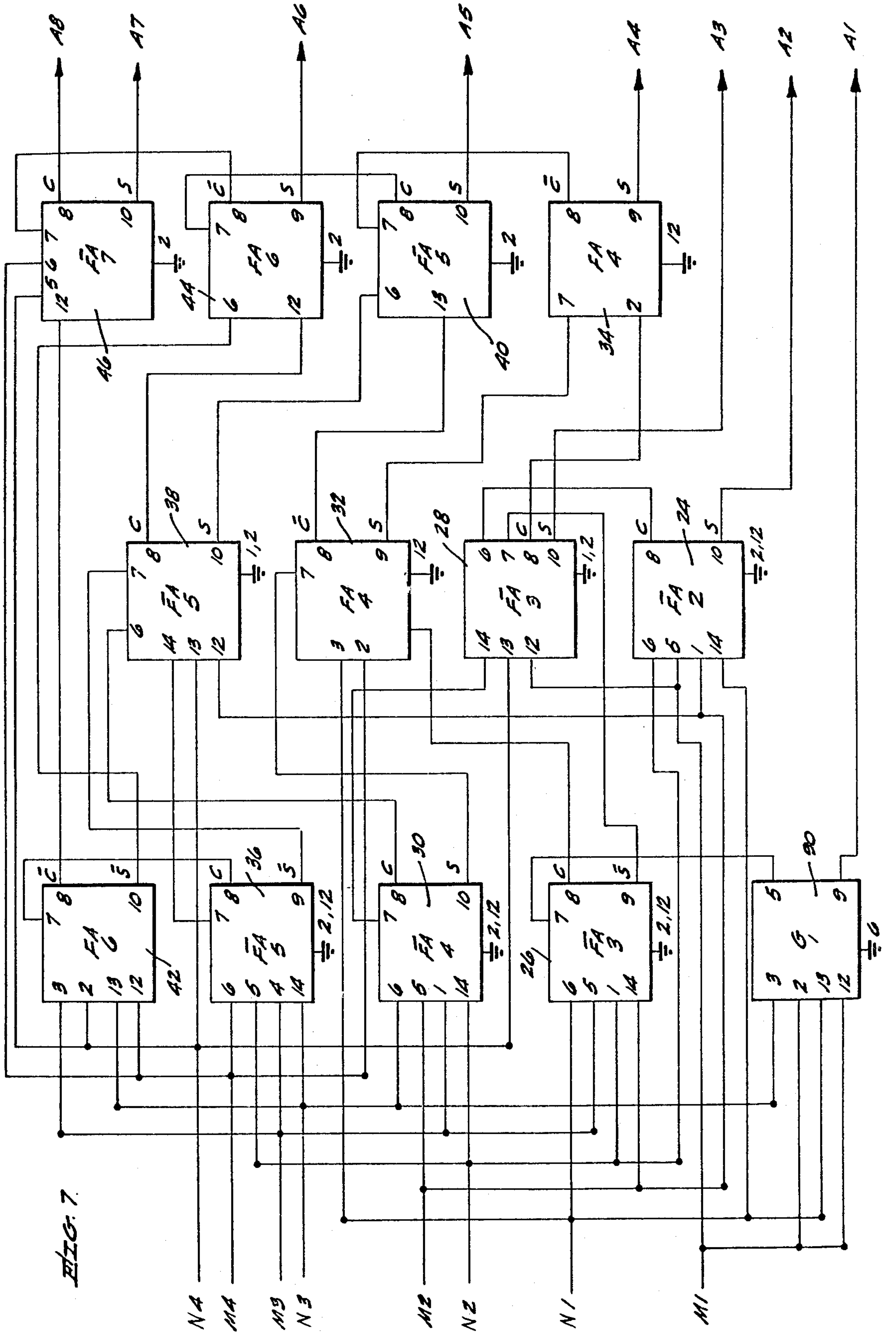
FIG. 7 is a block diagram illustrating a multiplier module having gated full adder circuits of FIG. 6 interconnected therein.

Reference is now made to a specific implementation of a multiplier module such as multiplier module 14 for producing the partial product PP1 having bits A1 through A8 associated with the portion MB1 of the multiplication matrix. More specifically, in FIG. 7 a plurality of the full adder circuits are interconnected. For purposes of simplifying the description, the full adders have been illustrated in block diagram form, with the terminals or pins thereof indicated in each block numbered to correspond to the terminals so numbered in FIG. 6.

In operation, the least significant bit A1 in the partial product is produced by feeding the least significant multiplier bit M1 and the least significant multiplicand bit N1 to the input terminal 12 and 13 on gated full adder 92 wherein they are ANDed to produce a sum output signal S, which is the least significant bit A1 of the partial product as indicated in FIG. 1. Of course, the gate 90 can be eliminated by feeding the input bits M1 and N1 and M1 and N3 to unused gates in other ones of the gated full adders to produce the signal M1·N1 and M1·N3.

The second significant bit A2 is produced by the full adder 24 when multiplier digit M1 and multiplicand digit N2 are fed to the input terminals 5 and 6, respectively, and multiplier bit M2 and multiplicand bit N1 are fed to the input terminals 1 and 14, respectively, wherein the pairs of input signals are ANDed and added in accordance with the previously referenced equations to produce a sum output signal S on terminal 10, which is the second significant digit A2, and a carry signal on the output terminal 8.

The third significant bit A3 is produced by feeding the M1 multiplier bit and the N3 multiplicand bit to the input terminals 2 and 3 of gated full adder 92 wherein they are ANDed and fed from output terminal 5 to input terminal 7 of full adder 26. In addition, the full adder 26 received the M3 multiplier bit and the N1 multiplicand bit wherein they are ANDed and receives the M2 multiplier bit and the N2 multiplicand bit where they are also ANDed. These input signals are then added together to produce a sum complement signal S and a carry signal C on the output terminals 9 and 8, respectively. This sum complement signal S is fed to the full adder 28 along with the carry signal C from the full adder 24, wherein they are added together to produce a sum output signal S which is the third significant bit A3, and a carry signal C.

The fourth significant bit A4 is produced by feeding the M2 multiplier digits and the N3 multiplicand digit to the input terminals 5 and 6 of full adder 10, wherein they are ANDed, and feeding the multiplicand bit N2 and the multiplier bit M3 to the input terminals 1 and 14, respectively, wherein they are ANDed. In addition, the M1 multiplier bit and the N4 multiplicand bit are fed to the input terminals 12 and 13 of the full adder 28 to produce an ANDed output signal M1·N4 on terminal 14 which is fed to the input terminal 7 of the full adder 30. The full adder 30 operates on these three ANDed signals to produce a sum signal S and a carry signal C on the output terminals 10 and 8, respectively. This sum signal S is fed to input terminal 7 of the full adder 32. In addition, the M4 multiplier bit and the N1 multiplicand bit are fed to the input terminals 2 and 3 of the full adder 32 and are ANDed. The carry signal from the full adder 26 is fed to input terminal 12 of full adder 32. The full adder 32 operated on these input signals to produce a sum signal S and a carry complement signal C. This sum signal S and a carry signal C from full adder 28 are fed to the input terminals 7 and 2, respectively, of a full adder 34 wherein they are added together to produce a sum signal S, which is the fourth significant bit A4, and a carry complement signal C.

The fifth significant bit is produced in the portion of the circuit including full adders 26, 38 and 40. More specifically, the full adder 36 received the N2 multiplicand digit and the M4 multiplier digit on terminals 5 and 6, wherein they are ANDed together to produce the M4·N2 signal. In addition, the M3 multiplier digit and the N3 multiplicand digit are received at input terminals 4 and 14, wherein they are ANDed together to produce the signal M3·N3. The M2 multiplier digit and the N4 multiplicand digit are received at input terminals 21 and 13 of full adder 38 wherein they are ANDed together and fed from output terminal 14 thereof to input terminal 7 of full adder 36. The full adder 36 operates on these input signals to produce a sum complement signal S and a carry signal C on the output terminals 9 and 8, respectively. The sum complement signal S is fed to the input terminal 7 of the full adder 38, and the carry signal C from full adder 30 is fed to the input terminal 6. In addition, the bits M2 and N4 are received at the input terminals 12 and 13. Full adder 38 operates on these input signals to produce a sum output signal S and a carry signal C on the output terminals 10 and 8, respectively. This sum signal S is fed to the input terminal 6 of full adder 40 and the carry complement signal C from full adder 32 is fed to the input terminal 13. In addition, the carry complement signal C from full adder 34 is fed to the input terminal 7 of full adder 40. Full adder 40 operates on these input signals to produce a sum output signal S, which is the fifth significant bit A5 and a carry signal C.

The sixth significant bit A6 is produced in the portion of the circuit including full adders 42 and 44. For example, the N4 multiplicand bit and the M3 multiplier bit are fed to the input terminals 2 and 3 of full adder 42 wherein they are ANDed. In addition, the M4 multiplier bit and the N3 multiplicand bit are fed to the input terminals 12 and 13 wherein they are ANDed. Furthermore, the carry signal C from full adder 36 is fed to input terminal 7 of full adder 42 whereupon the full adder 42 operates on these input signals to produce a sum complement signal S and a carry complement signal C on output terminals 10 and 8, respectively. This sum complement signal S is fed to input terminal 6 of full adder 44. In addition, full adder 44 receives the carry signal C from the full adder 38 and the carry signal C from the full adder 40 at input terminals 12 and 7, respectively. The full adder 44 adds these received input signals and produces a sum output signal S, which is the sixth significant bit A6, and a carry complement signal C.

The seventh and eighth significant bits A7 and A8, respectively, are produced in the portion of the circuit including full adder 46. For example, the N4 multiplicand bit and the M4 multiplier bit are fed to the input terminals 5 and 6 of full adder 46 and are ANDed. In addition, full adder 46 receives the carry complement signal C from full adder 42 at input terminal 12 and the carry complement signal C from full adder 44 at input terminal 7. The full adder 46 operates on these input signals to produce a sum signal S, which is the seventh significant bit A7, and a carry signal C which is the eighth significant bit A8.

The three-input adder circuit 22 of FIG. 2 can also be implemented using this same gated full adder circuit described in FIG. 6. In order to utilize this gated full adder circuit, it is only necessary to connect the leads to the terminals numbered in the full adder blocks of FIG. 5.

Figure 8:
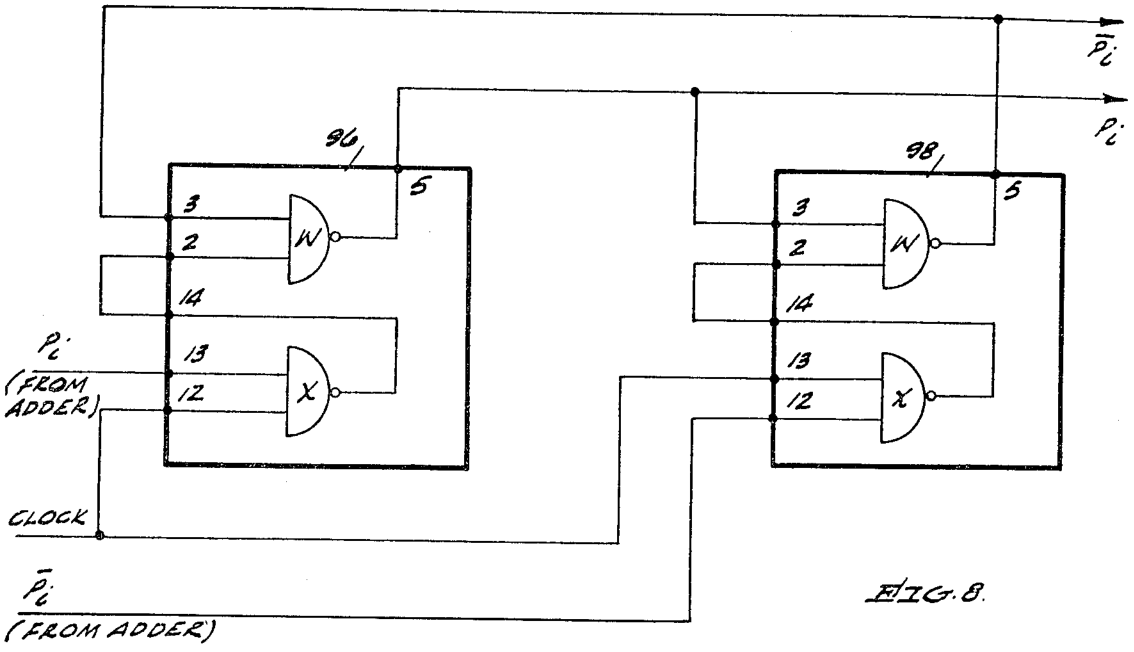
FIG. 8 is a block diagram illustrating one stage of the register of FIG. 2 utilizing portions of two of the gated full adder circuits illustrated in FIG. 5.

The register 90 of FIG. 2 can also be implemented using this same gated full adder circuit illustrated in FIG. 6. For example, FIG. 8 illustrates one stage of the 17-bit, clocked register which uses the gate portion of two gated full adder circuits 96 and 98 of the type previously described with reference to FIG. 6. In operation, when a clock signal fed to the NAND gate input terminals 12 of circuit 96 and terminal 13 of circuit 98 goes high, these NAND gates provide the inverse of the final product bit $P_i$ and its complement $P_i$, respectively, which have been received on input terminals 13 and 12, respectively, from the $i^{th}$ adder circuit of 22. The output signal from these NAND gates X are fed to the input terminals 2 of NAND gates W in the same circuit wherein they are inverted again and are stored as output signals $P_i$ and $P_i$, respectively, by the cross-coupling of the output of each of the W gates with an input terminal of the other W gate.

The sign determination of the product can be accomplished with a single full adder circuit of FIG. 6 by feeding the sign of the multiplier to input terminal 1 and the sign of the multiplicand to input terminal 6 and obtaining the sign of the product on output terminal 10. In order to have the full adder operate in this manner, the terminals 2 and 12 should be grounded to disable the gates W and X. As a result, the full adder would then be used in an inverted mode and terminal 10 would provide the sum of the A and B and $C_i$ input signals which (with $C_i$= 0 by leaving terminal 7 open) is the EXCLUSIVE OR of A and B inputs signals and thus the required sign bits.

Although the embodiment has been described with reference to an eight-bit operand, it should be understood that the above described circuit can be used for operands of less than eight bits without any modification or that the circuit can be enlarged to handle operands of a greater length by increasing the number of modular multipliers connected in parallel circuit relationship. In addition, although the multiplier modules have been illustrated and described as being partitioned to handle four-bit operands, it should be understood that they can be partitioned for operands less than four bits or for operands greater than four bits.

It should be understood that if more modular units are connected to process operands of a greater word length, the three-input adder would have to be configured to process four or more bits at a time.

Figure 9:
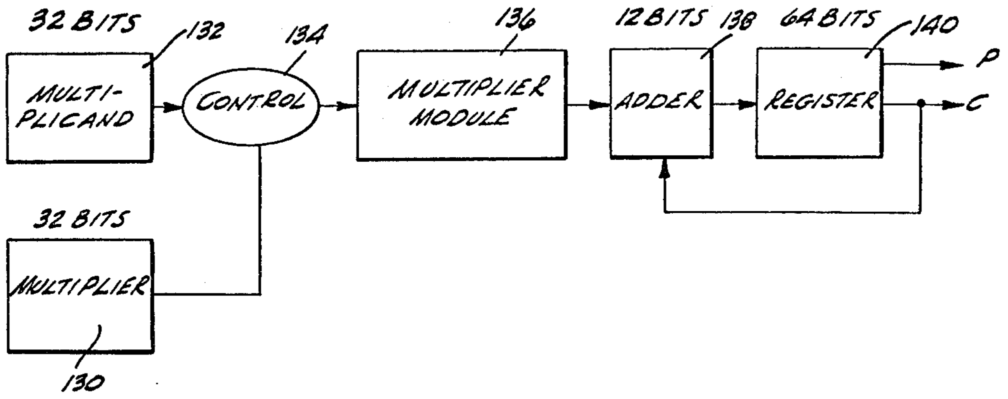
FIG. 9 is a block diagram illustrating a single multiplier module of the type illustrated in FIG. 4 for processing 32-bit operands.

In order to gain speed and to save circuits in long word-length application, "pipelining" of a modular carry advance multiplier can be used. That is, successive groups of the multiplier bits and multiplicand bits can be sequenced through a single multiplier module which forms a partial product. The partial product is then summed with the sum of previous partial products until all multiplier-multiplicand groups have been so multiplied and summed. For example, in the circuit of FIG. 9, the multiplication of the 32 bit multiplier and a 32 bit multiplicand is performed by sequencing partitioned four-bit multipliers and four-bit multiplicands from input device 130 and 132 through a control circuit 134 to a multiplier module 136 of the type previously described with reference to FIG. 7. In other words, successive partitioned groups of the multiplier bits and multiplicand bits are sequenced through a single multiplier module 136 which then forms successive partial products that are fed to a carry-advance adder 138. Each successive partial product is summed with the sum of previous partial products fed back from a 64 bit register 140 until all partitioned multiplier-multiplicand groups have been so multiplied.

More specifically, the 32 multiplier bits and the 32 multiplicand bits are received from the input devices 130 and 132 which can be 32 bit registers, respectively. The 32 outputs from these registers 130 and 132 are fed simultaneously to a control circuit 134.

The control circuit 134 can be of the type which includes a counter that is incremented by a clock signal at the multiplication rate wherein the counter outputs are fed to a decoder which produces a selected four out of 32 select signals for the multiplicand and a four out of 32 select signals for the multiplier. These four out of 32 select signals are fed into 32 AND gates so that only the four multiplicand bits and the four multiplier bits fed to the four AND gates having the signals applied to them produces output signals which are fed to the multiplier module 136. Thereafter, this procedure is continued for the 64 different partitionings of the 32 bit multiplier and multiplicand in a sequential manner.

The multiplier module 136 receives the partitioned multiplier bits and multiplicand bits and multiplies them together in the manner previously described to sequentially produce the partial products PP1 through PP16.

The partial products PP1 through PP16 are sequentially received by an adder circuit 138 which is a 12-bit carry look ahead of the type previously described wherein the partial product PP*i* being received is added with the sum of the partial products PP1 through $PP_{i-1}$ previously received, wherein the sum of these partial products is then fed to the register 140.

The register 140 is a 64 bit register wherein the product bits are stored and a feedback signal is produced. For example, for the first partial product,PP1, the output of adder 138 includes the partial product bits A1 through A8 which are stored in the register 140. For the next partial product PP2, the four most significant bits A5 through A8 from register 140 are fed to the adder 138 wherein they are added with the four least significant bits B5 through B8 of the partial product PP2 to produce a partial product of PP1 plus PP2 which is fed to the register 140. Thereafter, this process is continued in accordance with the previously explained partitioning process until all 32 bits of the multiplicand and 32 bits of the multiplier have been multiplied during the 64 time periods to produce a final product having 64 bits P1 through P64.

In regard to linear digital filtering, the circuit can be used to add the operand P to the product of (A × B) where the product P is equal to the sum of all of the products for a particular input. For example, in FIG. 10, a radar filter bank (not shown) having 16 filters and 32 eight-bit pulse returns per filter dump is fed to the linear digital filter as input signals $A_{ik}$ and $B_{ik}$ to produce an output signal $P_i^k = [(A_i \times B^k) + P^k_{i-1}]$ where:

$k$ = the filter number;

$i$ = the number of the pulse return;

$A_i$ = the $i^{th}$ pulse return (in-phase and quadrature components); and $B^k$ = the complex phasor coefficients associated with the $k^{th}$ filter which determines the digital filter characteristics of shape and tuning.

Figure 10:
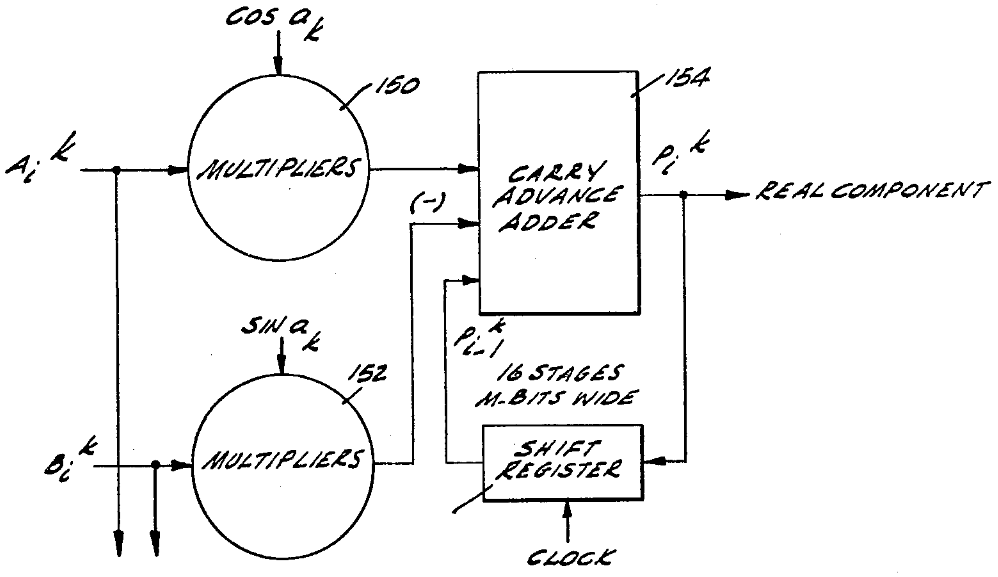
FIG. 10 is a block diagram illustrating the modular multiplier in a linear digital filter.

In FIG. 10, the real component $P_i^k$ is produced by feeding input signal $A_1^k$ into the modular multiplier 150 wherein it is multiplied by the filter phase shift signal cosine $\alpha_k$ to produce the four partial products PP1 through PP4,in the manner described with reference to FIG. 3. In addition, the input signal $B_i^k$ is fed to the multiplier 152 which is of the type described with reference to FIG. 2 wherein it is multiplied by the filter phase shift signal sine $\alpha_k$ to produce the four partial products PP1 through PP4 which are inverted.

The partial products from the multiplier 150 and 152 are fed to the carry-advance adder 154 wherein their product is added to the previous sum of products for that filter $k$ by adding an additional input to the carry-advance adder 154 and bringing the previous sum of the adder from a 16-bit shift register memory 156 in response to a clock signal. The imaginary component $P_i^k$ is produced by a similar circuit wherein the input $B_i^k$ is multiplied by cosine $\alpha_k$ and the input $A_i^k$ is multiplied by the signal sine $\alpha_k$ and there is no inversion of either of the partial products fed to the carry-advance adder 156. The filtering is accomplished by successively incrementing the filter number $k$ from 1 through 16 and then incrementing the number of pulse returns $i$ until $i$ equals 32, at which time the filtered outputs are dumped.

The use of only a clock pulse to control the multiplication and addition rate allows the filter processing rate to be easily synchronized with the input data. Thus, as long as the maximum processing rate is not exceeded, any future system processing requirements can be accommodated with minimum change in the above-described processor. The only changes would possible be in the clock rate, additional shift register modules and/or filter modules.

It should be apparent from the above description that the invention is applicable to many conventional speed-up techniques and has many other applications.

While the salient features have been illustrated and described with respect to particular embodiments, it should be readily apparent that modifications can be made within the spirit and scope of the invention, and it is therefore not desired to limit the invention to the exact details shown and described.

What is claimed is:

1. A digital circuit forming the product of a first digital word and a second digital word, each of said words being divided into groups of equal numbers of bits in adjacent bit positions, said circuit comprising;
   - a plurality of identical partial product multiplier circuits operating simultaneously, each being coupled to receive a different combination of one of said groups of bits of said first digital word and one of said groups of bits of said second digital work for producing a partial product; and
   - adder means for combining the partial products from said identical partial product multiplier circuits to produce a final product wherein each of said partial product multiplier circuits includes a plurality of identical full adder circuits.

2. A digital circuit for forming the product of a first digital word and a second digital word, each of said words being divided into groups of equal numbers of bits in adjacent bit positions, said circuit comprising:
   - a plurality of identical partial product multiplier circuits operating simultaneously, each being coupled to receive a different combination of one of said groups of bits of said first digital word and one of said groups of bits of said second digital word for producing a partial product; and
   - adder means for combining the partial products from said identical partial product multiplier circuits to produce a final product wherein said adder means includes a plurality of identical full adder circuits.

3. A digital circuit for forming the product of a first eight-bit digital word and a second eight-bit digital word, each of said eight-bit digital words having two four-bit groups of adjacent bits, said circuit comprising:
   - four identical partial product multiplier circuits operating simultaneously, each of said partial product multiplier circuits being coupled to receive a different combination of one four-bit group of bits from each of the digital words to form an eight-bit partial product; and
   - adder means for combining the partial products from said four partial product multiplier circuits to form the final product wherein each of said partial product multiplier circuits includes a plurality of identical full adder circuits.

4. A digital circuit for forming the product of a first eight-bit digital word and a second eight-bit digital word, each of said eight-bit digital words having two four-bit groups of adjacent bits, said circuit comprising:
   - four identical partial product multiplier circuits operating simultaneously, each of said partial product multiplier circuits being coupled to receive a different combination of one four-bit group of bits from each of the digital words to form an eight-bit partial product; and
   - adder means for combining the partial products from said four partial product multiplier circuits to form the final product therein said adder means includes a plurality of identical full adder circuits.

5. A digital circuit for forming the product of a first eight-bit digital word and a second eight-bit digital word, each of said eight-bit digital words having a first four-bit group of adjacent bits and a second four-bit group of adjacent bits, said circuit comprising:
   - first, second, third and fourth identical partial product multiplier circuits operating simultaneously;
   - said first partial product multiplier circuit being coupled to receive the first four-bit group of adjacent bits of the first eight-bit digital word and the first four-bit group of adjacent bits of the second eight-bit digital word;
   - said second partial product multiplier circuit being coupled to receive the first four-bit group of adjacent bits of the first eight-bit digital word and the second four-bit group of adjacent bits of the second eight-bit digital word;
   - said third partial product multiplier circuit being coupled to receive the second four-bit group of adjacent bits of the first eight-bit digital word and the first four-bit group of adjacent bits of the second eight-bit digital word;
   - said fourth partial product multiplier circuit being coupled to receive the second four-bit group of adjacent bits of the first eight-bit digital word and the second four-bit group of adjacent bits of the second eight-bit digital word; and
   - adder means for combining the partial products from said first, second, third and fourth partial product multiplier circuits to form the final product wherein each of said partial product multiplier circuits includes a plurality of identical full adder circuits.

6. A digital circuit for forming the product of a first eight-bit word and a second eight-bit digital word, each of said eight bit digital words having a first four-bit group of adjacent bits and a second four-bit group of adjacent bits, said circuit comprising;
   - first, second, third, and fourth identical partial product multiplier circuits operating simultaneously;
   - said first partial product multiplier circuit being coupled to receive the first four-bit group of adjacent bits of the first eight-bit digital word and the first four-bit group of adjacent bits of the second eight-bit digital word;
   - said second partial product multiplier circuit being coupled to receive the first four-bit group of adjacent bits of the first four-bit digital word and the second four-bit group of adjacent bits of the second eight-bit digital word;
   - said third partial product multiplier circuit being coupled to receive the second four-bit group of adjacent bits of the first eight-bit digital word and the first four-bit group of adjacent bits of the second eight-bit digital word;
   - said fourth partial product multiplier circuit being coupled to receive the second four-bit group of adjacent bits of the first eight-bit digital word and the second four-bit group of adjacent bits of the second eight-bit digital word; and
   - adder means for combining the partial products from said first, second; third and fourth partial product multiplier circuits to form the final product wherein the adder means includes a plurality of identical full adder circuits.

* * * * *